3,309,146
METHOD OF TRANSPORTING MATERIAL AND DEVICE THEREFOR
John D. Russell, Franklin, Pa., assignor to Conair, Incorporated, Franklin, Pa.
Original application Dec. 11, 1962, Ser. No. 243,825. Divided and this application June 9, 1966, Ser. No. 564,460
9 Claims. (Cl. 302—17)

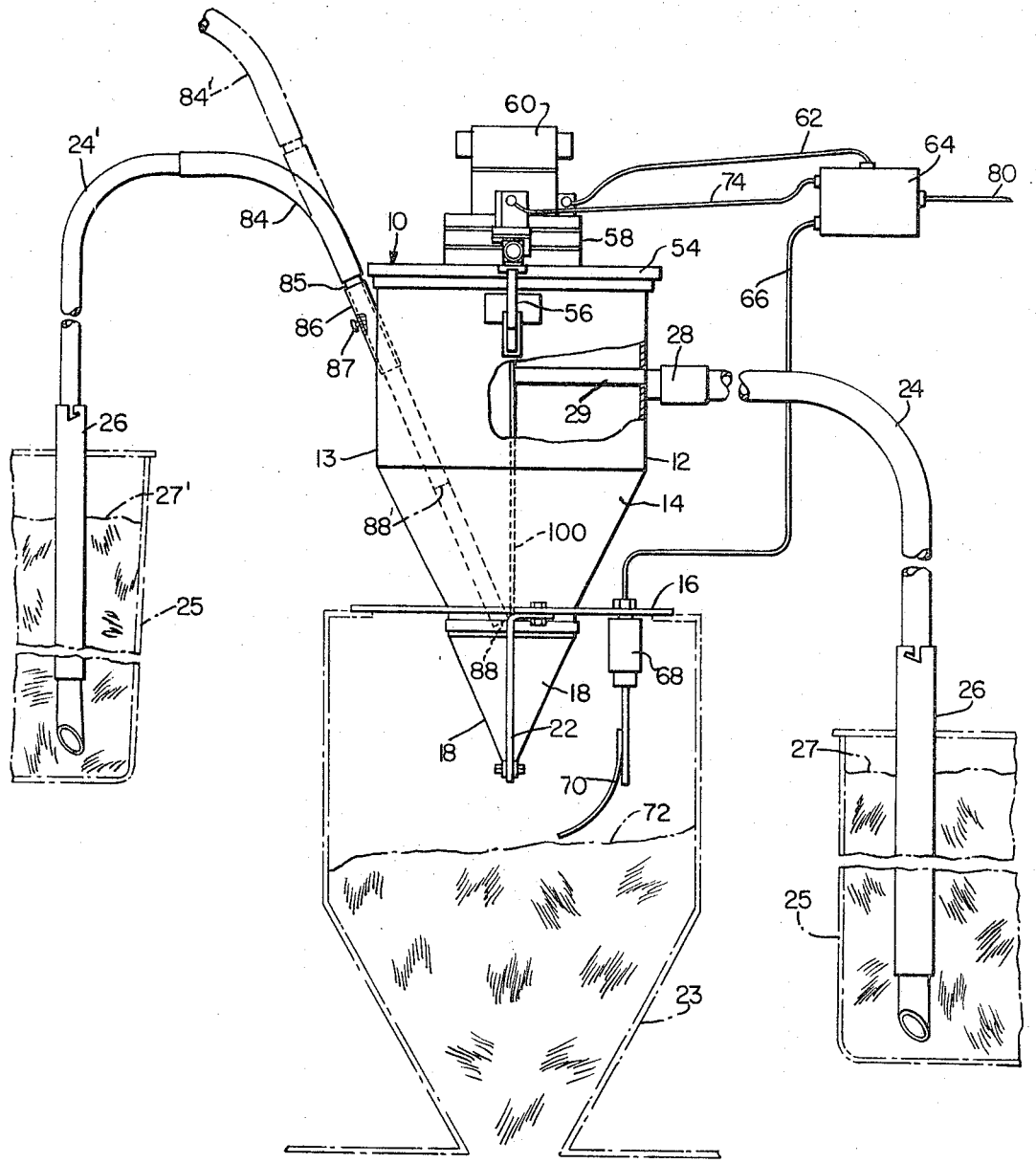

This is a division of application Ser. No. 243,825, filed Dec. 11, 1962, now Patent No. 3,273,943, issued September 20, 1966.

This invention relates to a material transporting method and device and more particularly to a material loader and method for transporting a plurality of finely divided granular or pulverant materials from separate storage bins to the hopper of a machine while maintaining a fixed ratio of the materials supplied.

In many industries such as the plastic industry it is common practice to transport finely divided, granular or pulverant material from a storage bin, through a feed pipe to a material receiving chamber by creating a vacuum in the receiving chamber. In many instances it is desirable to supply at least two different materials, such as virgin and regrind material, in a fixed volume ratio to a machine for processing or forming. The structure and method of this invention provides for supplying a plurality of materials in a fixed volume ratio to a single receiving chamber for subsequent feeding to a machine hopper from the chamber.

Accordingly, one object of this invention is to provide a new and improved device and method for transporting a plurality of pulverant or granular materials to a common chamber.

A specific object of this invention to provide a new and improved material transporting device wherein a periodically evacuated material receiving chamber is provided with a plurality of inlet tubes at least one of which is adjustable in relation to the chamber so that different materials will be transported into the chamber at preselected but adjustable volume delivery rates resulting in a desired volume ratio of such material to the other materials when the chamber has been filled to a preselected delivery level.

These and other objects and advantages of this invention will become more fully apparent upon consideration of the following description and the drawing which is a side elevational view of a material loader constructed according to the principles of this invention.

As is known and as more fully shown and described in the parent application of which this application is a division a material loader, generally indicated at 10, comprising a hollow, generally cylindrical housing or body 12 having a downwardly tapering, frusto-conical, lower portion 14 rigidly secured to a horizontally extending, generally circular mounting plate 16 having a central opening through which the lower portion 14 extends. Rigidly secured about the outer bottom surface of the bottom portion 14 is a resilient, tubular, downwardly extending, throat member 18 having diametrically opposed lower portions rigidly secured to outwardly extending throat hinges which are in turn pivotally mounted on downwardly extending outrigger members 22 rigidly secured to a bottom surface of the mounting plate 16. The throat member 18 and associated parts form a bottom dumping valve for the body 12 characterized by the action of closing the opening at the bottom of the body 12 whenever pressure external to the body 12 is greater than the pressure within the body 12 and opening to allow material to flow downward therethrough whenever the pressure within the body 12 is equal to or greater than the ambient pressure.

It is to be appreciated that such check type dumping valves are well known in the art and may be any one of the several types without departing from the scope of this invention.

The material loader 10 is shown for purposes of illustration as being mounted on an upper surface of a hopper 23 which is part of a machine (not shown) such as a plastic molding device requiring a generally constant supply in batches of a granular or pulverized material.

The interior of the body 12 communicates through a suitable feed line 24 with a downwardly extending, telescopic feed pipe 26 more particularly shown and described in U.S. Patent 3,018,135. The lower end of the feed pipe 26 is submerged in a body of finely divided, granular or pulverized solid material 27 here shown as occupying the interior of a suitable material containing bin 25 partially shown in dotted outline. The feed line 24 connects to the body 12 and communicates internally therewith through a connector 28 having an inwardly extending distributor portion 29 extending radially inward of the inner opening of the body 12. The extended portion 29 is open downwardly into the body 12 so that the pulverized or granular material 27 flowing through the feed line 24 will be directed downwardly as it enters the body 12.

A second bin 25 containing a different material 27' is to be mixed with the material 27 in a predetermined desired ratio is similarily transported by another telescopic feed pipe 26 through a feed line 24' into the body 12. The feed line 24' communicates through a flexible feed line 84 with an elongated, straight, obliquely inclined feed pipe 85 slideably received and mounted in a mounting sleeve 86 communicating through a side portion of the housing with the interior of the lower portion 14. The feed pipe 85 is fixed in a desired position in the mounting sleeve 86 by means of a threaded retainer member such as a set screw 87 or other means of establishing friction to hold the feed pipe 85 in the desired position. The feed pipe 85 extends downwardly into the interior of the housing 12 and has a hollow guiding means or bottom end 88 which is adjustable between this extreme downward position and other positions such as the position shown as 88' by simple loosening of the set screw 87 and pulling the feed pipe 85 up into a higher position with a new shape and position of the flexible feed line 84 such as indicated at 84'. The different positions of the bottom free end of the feed pipe 85 such as 88 or 88' are determined by the desired ratio of material 27 to the material 27'.

Body 12 has an upper cylindrical portion 13, the upper edge of which supports a cover 54 which is suitably sealed at edge portion the outer periphery thereof to the body 12 to provide a dust tight closure with the body 12. The top cover 54 is suitably held in place such as by downwardly biased spring type clamps 56 (only one of which is shown). Top cover 54 has a central opening (not shown) over which is mounted an air pump 58 of any suitable type powered by a suitable electric motor 60 which is suitably electrically connected by a cable 62 to an electrical timing device 64 which is in turn connected by a suitable cable 66 to a material sensing level switch 68 of a type well known in the art which has a downwardly extending vertically adjustable material sensing element 70. Sensing element 70 is so positioned and adjusted so that when the granular or pulverant material from the bins 25, transferred to the hopper 23 by the material loader 10, reaches a predetermined height (indicated by the line 72) the sensing element 70 is moved to actuate the level switch 68 into an open position. A suitable supply cable 80 is connected to the timing device 64 which timing device 64 is connected by a cable 74 to a control solenoid (not shown). For a more complete description of the structure of the cover 54 and the energization and operation of the control circuit the parent application is to be referred to.

Operation of this device begins when the hopper 23 is empty causing the level switch 68 to be closed and thereby energize the pump motor 60. The pump motor 60 rotates a pump impeller (not shown) and causes air to travel from the housing 12 outwardly through the pump 58 lowering the pressure within the housing 12 causes the throat member 18 to collapse so that no air can enter the housing 12 from the exterior of the member 18. The lower pressure within the housing 12 is communicated through the connection 28-tube 24 and pipe 85-tube 24' to the telescopic feed pipes 26. Atmospheric pressure on the top surface of the pile of material 27 and 27' pushes material into the feed pipes 26, up through the tubes 24 and 24' through the connector 28 and feed pipe 85 into the housing 12. The material 27 is directed in a downward direction by the distributor portion 29 and the material 27' is discharged from the downward free end of pipe 85 so that the material 27 and 27' falls into the lower portion 14 of the housing 12. When the level of material within the housing 12 reaches and encompasses the bottom end 88 of the feed pipe 85 communication between the interior of the housing 12 and the feed pipe 85 is cut off and no more material from the pile 27' is transported until a new cycle begins. Material from the pile 27 will continue to be transported during the remainder of the vacuum portion of a particular cycle and it is obvious that, by positioning the free end 88 of the feed pipe 85 upwardly or downwardly between the positions shown as 88 and 88', various feed ratios of the two materials 27 and 27' can be established so that for each cycle and consequently for all cycles a desired ratio of material from the pile 27 and the pile 27' will be transported and subsequently deposited in the hopper to be used by a machine as required.

The filling action of the material loader 10 continues for a suitably controlled period of time at the end of which the pump motor 60 is de-energized so that the pump motor stops and the vacuum within the housing 12 is destroyed. Thereafter the weight of the material in the lower portion 14 opens the throat member 18 allowing the material to flow downward into the hopper 23.

Such normal cycling of the apparatus continues until the pile of material within the hopper 23 reaches a predetermined level such as that indicated by the line 72 at which time the sensing element 70 is contacted by the material within the hopper and pushed aside into the position shown so that the level switch 68 is opened. With the level switch in the open position the cycling of the device is interrupted and no more action takes place until the pile of material within the hopper 23 has been reduced below the level 72 so that the level switch 68 again closes. As soon as the level switch 68 closes the normal cycling of the apparatus is resumed and continues until the level 72 is again reached.

Although only one adjustable feed pipe 85 has been shown and described if desired more than one such feed pipe 85 and associated material supply therefor may be provided so that a fixed volume ratio of three materials is supplied to the body 12. In many instances it is desired that the influx of material 27' provide the sealing off of the free end 88 and in such instances the body 12 is provided with an internal baffle 100 which extends vertically through the body 12 and is secured at the sides thereof to divide the interior of the housing or body 12 into two hopper or chamber portions one each for the materials 27 and 27'. In these instances the free end of the distributor 29 terminates at or short of the baffle 100 so that material 27 is discharged only in one portion of the body 12. In some instances a baffle such as baffle 100 can be provided to divide the body 12 into chamber portions with each portion receiving one or more materials as desired.

Although not described, filter, not shown, is preferably provided across the upper portion of body 12 above the distributor 29 as described in the parent application.

A preferred embodiment of this invention having been shown and described and other embodiments having been described it is to be realized that such embodiments are merely illustrative and modifications therein can be made without departing from the broad spirit and scope of this invention. It is therefore respectfully requested that this invention be interpreted as broadly as possible and be limited only by the prior art.

What is claimed is:

1. A method of proportioning a plurality of granular or pulverant materials deposited in a chamber comprising, delivering a plurality of materials into a chamber through separate inlet lines, respectively, and positioning at least one of said inlet lines in said chamber to become ineffective for said delivering by deposit of material within said chamber prior to the discontinuance of said delivering by the remainder of said inlet lines.

2. A method of proportioning as set forth in claim 1 in which said delivering is into separated portions of said chamber.

3. A method of proportioning as set forth in claim 1 in which said delivering is of two pulverant or granular materials.

4. A method of proportioning as set forth in claim 1 and subsequently simultaneously discharging the material deposited in said chamber.

5. A material transporting device comprising, a pair of chamber portions, hollow material inlet means communicating with said chamber portions, respectively, means for evacuating said chamber portions to draw granular or pulverant materials into said chamber portions through said inlets which materials are deposited in said chamber portions, respectively, one of said inlet means including a hollow guiding means located within the one of said chamber portions cooperable therewith through which said granular or pulverant material flows, and said one inlet means having means for positioning said hollow guiding means at selectable positions with respect to said one chamber portion.

6. A material transporting device as set forth in claim 5 in which said chamber portions are separate hopper portions of a housing.

7. A material transporting device as set forth in claim 6 in which said means for positioning are carried by said housing.

8. A material transporting device as set forth in claim 5 in which said chamber portions have means for permitting simultaneous discharge of material therefrom.

9. A material transporting device as set forth in claim 5 in which said one inlet means includes a flexible portion.

References Cited by the Examiner

UNITED STATES PATENTS

| | | | |
|---|---|---|---|
| 2,812,217 | 11/1957 | Koch et al. | 302—59 |
| 2,890,080 | 6/1959 | Whitlock | 302—59 |
| 3,219,394 | 11/1965 | Moss et al. | 302—59 |
| 3,273,943 | 9/1966 | Russell | 302—59 |

ANDRES H. NIELSEN, *Primary Examiner.*